Figure 1:
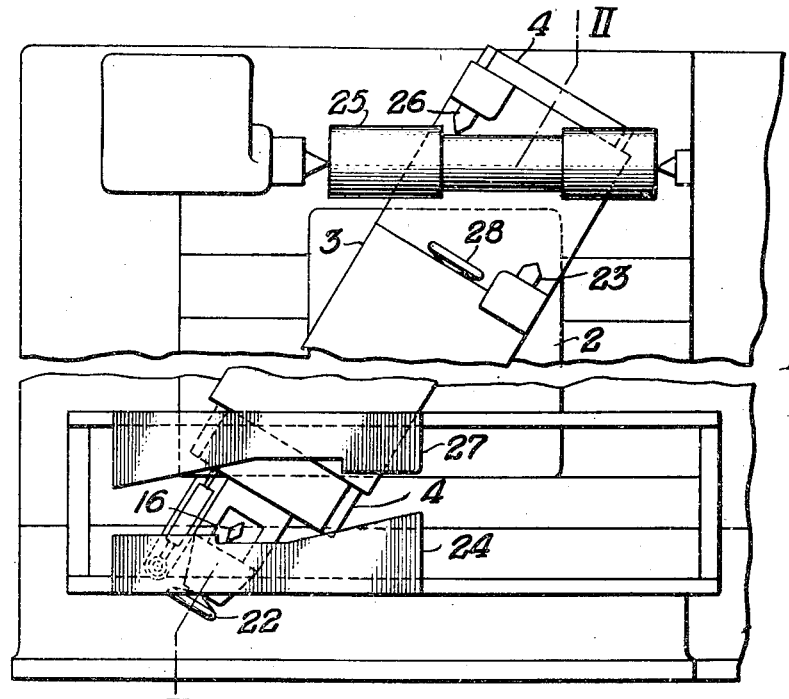

March 9, 1948.  O. VON ZELEWSKY  2,437,570
LATHE
Filed May 29, 1944  3 Sheets-Sheet 1

INVENTOR:
OTTOMAR VON ZELEWSKY,
BY Richards Geier
ATTORNEYS

March 9, 1948. O. VON ZELEWSKY 2,437,570
LATHE
Filed May 29, 1944 3 Sheets-Sheet 2

INVENTOR:
OTTOMAR VON ZELEWSKY,
BY Richard Geier
ATTORNEYS

Patented Mar. 9, 1948

2,437,570

UNITED STATES PATENT OFFICE 2,437,570

LATHE

Ottomar von Zelewsky, Neuhausen-on-the-Rheinfall, Switzerland, assignor to Aktiengesellschaft der Eisen- und Stahlwerke vorm. Georg Fischer, Schaffhausen, a Swiss corporation Application May 29, 1944, Serial No. 537,771
In Switzerland May 15, 1943

Section 1, Public Law 690, August 8, 1946
Patent expires May 15, 1963

6 Claims. (Cl. 82—14)

1

The present invention relates to a lathe with hydraulically effected tool adjustment in which the feeler regulates the pressure of the constantly flowing pressure medium. In such lathes the feeler, which runs on the die affixed to the machine stand, can be accommodated in a transversely movable tool slide and made to govern the drive mechanism provided between the horizontal and the tool slides.

The profiling work of a lathe of this kind is restricted to pieces with steps forming an angle of not more than 60° to the rotary axis. Single vertical steps can be profiled on a blank with this type of lathe when the tool slide and the hydraulic feed device are made to work at an acute angle to the rotary axis. Where the die to be copied possesses several steps rising and falling vertically, the profiling work must be carried out in two stages, the tool slide placed obliquely to the right profiling the rising steps in the first longitudinal feed, and the falling steps being copied during the return of the cross slide, placed obliquely to the left. Another known system is that of working with two cross slides, two tool slides and two hydraulic feed devices simultaneously on the same piece from two dies, when various right-angled steps can be profiled simultaneously by swivelling the tool slide. Doubling the cross slide, tool slide and hydraulic feed device, however, involves the construction of a heavy and expensive machine tool.

As against this, the present invention is constructively a far more rational proposition. It fulfils the same purpose, viz. the profiling of rising and falling right-angled steps on a blank, by the affixing of two tools to the tool slide, said tools being operative in opposite directions and adjusted by means of a hydraulic feed device functioning in the two operative directions of the tools in such a manner that the blank is profiled in two successive stages of work after mutually complementary dies affixed to the machine stand. By this method of copying internal as well as external profiling can be carried out. In special cases, instead of a special die a special finished piece can be employed as prototype; here the control member of the hydraulic feed device is fitted with a fork-shaped feeler whose upper and lower edges pass along the upper and lower

2 edges respectively of the prototype serving as a double die.

Figure 2:
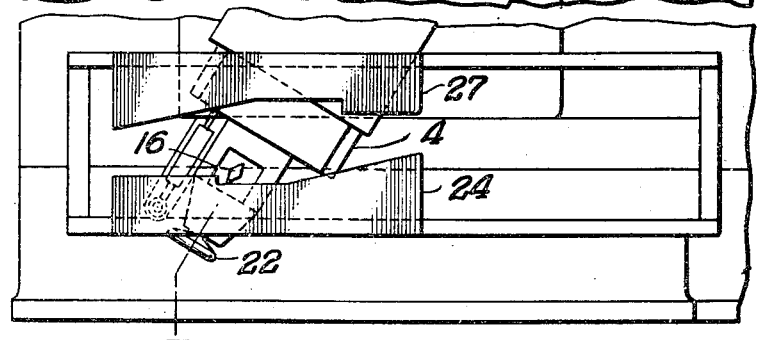
Figure 2:
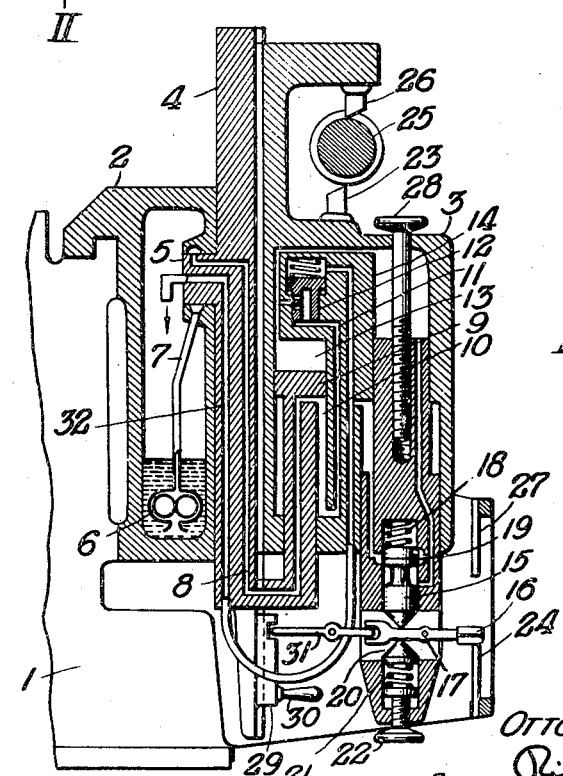
Figure 3:
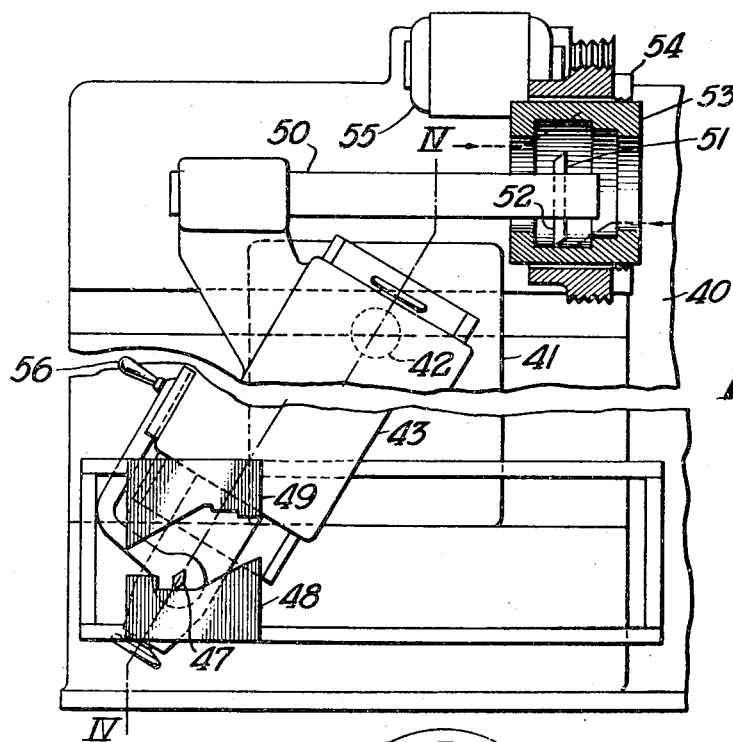
Figure 4:
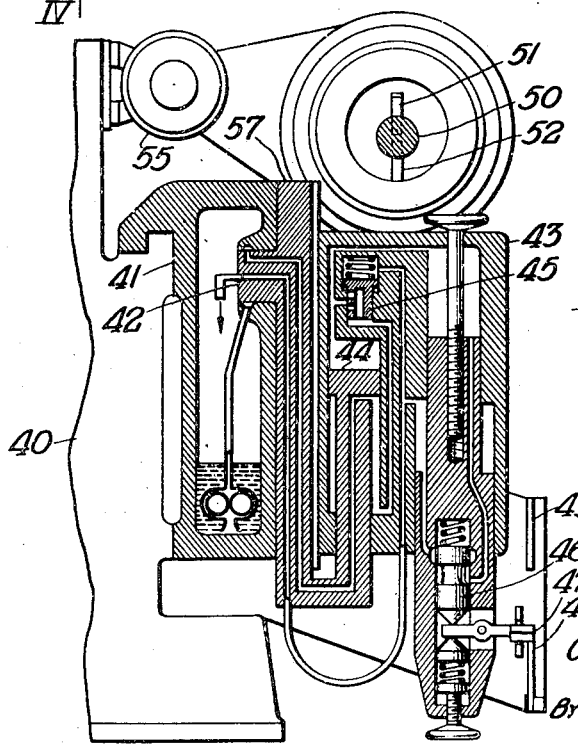
Figure 5:
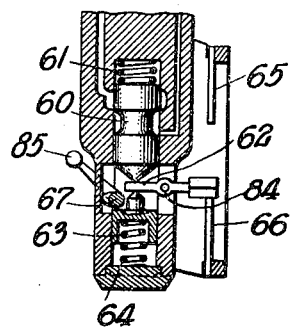
Figure 6:
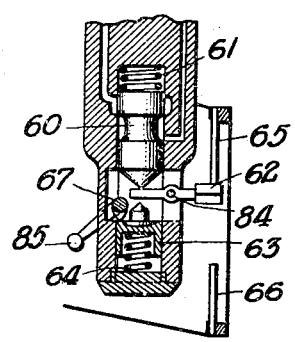
Figure 7:
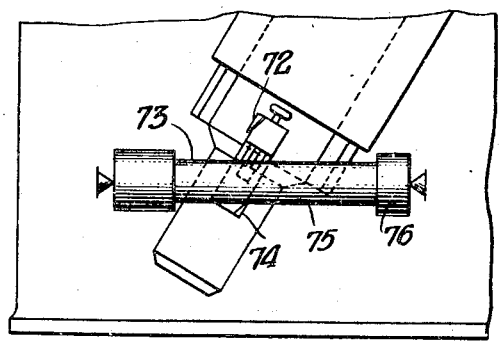
Figure 8:
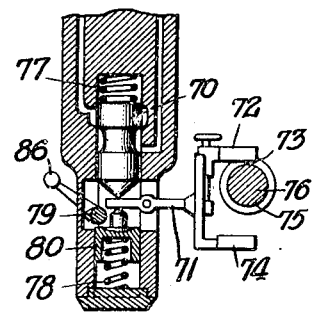

Some examples incorporating the present invention are given in the enclosed drawings, which show:

Fig. 1 front view of a first model,
Fig. 2 the same in vertical section II—II,
Fig. 3 front view of a second model,
Fig. 4 lathe 3 in vertical section IV—IV,
Figs. 5 and 6 each a section through the control member of the hydraulic feed device,
Fig. 7 front view of a further control member, and
Fig. 8 the same in section.

In Figs. 1 and 2 the machine stand is marked 1, the cross slide 2, and the obliquely placed tool slide 3. The tool slide 3 moves in a guide plate 4 which is mounted in the cross slide 2 and can be swivelled round pivot 5. Cross slide 2 is formed as an oil container in which forcing pump 6 for the hydraulic feed is placed. Pressure conduit 7 leads to pivot 5 and through it to section 8 of the pressure conduit opening into plunger 9 which controls the lift and fall of tool slide 3. From plunger 9 the pressure medium enters the lower pressure chamber 10 and thence passes conduit 11 to pressure reducing valve 12. The latter keeps the pressure in the lower pressure chamber 10 of plunger 9 at an adjustable, constant value. In normal service the oil flows from pressure reducing valve 12 into upper pressure chamber 13 of plunger 9, and simultaneously through conduit 14 to control member 15. Control member 15 is operated by a feeler lever 16 which can be swivelled round axle 17. Spring 18 presses control member 15 downwards and thereby causes control edge 19 to contact control member 15. On the side opposite the control member of feeler lever 16 there is a plunger 20 with spring 21 and regulating screw 22. Spring 21 is stronger than spring 18 but can be relieved by the regulating screw 22 to such an extent that only spring 18 is operative. Tool 23 works blank 25 from die 27; tool 26 works from die 24. Figs. 1 and 2 show a hydraulic feed device whose control member 15 is fitted with a feeler 16 of lozenge-shaped cross-section with the two edges cutting towards the directions of feed and successively passing along two mutually complementary dies 24 and 27 placed opposite each other. The mode of operation is as follows:

At the commencement of the profiling work regulating screw 22 is turned back, spring 21 is completely relieved, and only spring 18 acts upon control member 15. Control edge 19 is closed and the hydraulic pressure in pressure chamber 13 rises. Tool slide 3 is lifted till feeler 16 touches die 27. The movement of feeler 16 on die 27 displaces control member 15 against the pressure of spring 18 and opens control edge 19 so far that all the liquid forced by pump 6 can escape through the control member, thus setting height of tool slide 3 in accordance with die 27. Thereupon longitudinal feed of the lathe is switched on and causes feeler 16 to glide along die 27. According to its profile, die 27 alters the opening in control edge 19 and thus controls the profiling of the blank 25. After this first phase the longitudinal feed is switched off and the hydraulic feed device is reversed on to the second die 24. This is done by tightening regulating screw 22. The stronger spring 21 now overcomes the effect of spring 18 and presses control member 15 upwards till control edge 19 opens and the hydraulic pressure falls. Tool slide 3 is lowered accordingly till feeler 16 contacts die 24 as indicated in Fig. 2. Tool 26 has thus reached the end of its stroke and the return movement of the longitudinal feed initiates the second stage of the profiling work from die 24. At the end of the return stroke the longitudinal feed is switched off and the profiling work is completed. The essential difference in hydraulic feed is that when the profiling work is done from die 24 spring 21 governs the opening of control member 15, while die 24 controls the closing of control edge 19, that is, contrary to the first stage of the profiling work from die 27. With hand wheel 28 control member 15 with feeler lever 16 can be moved to allow exact adjustment of tools 23 and 26. By means of a handle 30 fitted to slide 29 feeler 16 can be arbitrarily controlled by a swivelling arm 31, if manual intervention in the profiling work should prove necessary. Number 32 designates the return conduit of the pressure medium from control member 15 and from pressure reducing valve 12.

Figs. 3 and 4 show an example incorporating the present invention for internal profiling. For this purpose the tool slide carries a tool head, placed parallel to the axis of the blank, to which are affixed two tools operative in opposite directions so the blank can be internally profiled from two mutually complementary dies. Machine stand 40 carries the longitudinally movable slide 41 together with guide plate 57, which can be swivelled round a pivot 42, of tool slide 43. The hydraulic feed device here consists of plunger 44, pressure reducing valve 45 and control member 46. Forcing pump, conduits and feeler 47 work in exactly the same way as in Examples 1 and 2. Dies 48 and 49 affixed to machine stand 40 together give the complete profile to be copied. The tool slide 43 carries the tool head 50 with the two turning tools 51 and 52. Blank 53, held by a chuck 54, is driven by motor 55. By means of a hand lever 56 feeler 47 can be adjusted arbitrarily. The dotted lines with arrow in Fig. 3 indicate how tools 51 and 52 enter and work blank 53. Normally tool 51 will begin the profiling work from die 49 in the stroke of the longitudinal feed to the right, turning tool 52 finishing the work from die 48 in the return stroke.

The change-over of the hydraulic feed device or the control member from one die to the other can also be effected in the manner shown in Figs. 5 and 6. Control member 60 is pushed downwards by spring 61. A plunger 63 with a considerably stronger spring 64, however, presses on feeler 62 supported by the pivot member 84 in the opposite direction. In Fig. 5 the feeler works from die 66 because the action of spring 64 overcomes that of spring 61, thus pushing control member 60 upwards till feeler 62 begins the profiling work from die 66. To make the feed device work from die 65 spring 64 must be eliminated by a cam 67 operated by lever arm 85. Figure 5 shows the cam 67 in turned out position so that the spring 64 can operate. In this position, the operation occurs toward the die 66. Figure 6 shows the position of the lever arm 85 in the opposite position, where the feeler 62 operates rotatingly around the axis 84 in the direction toward the die 65. Fig. 6 shows cam 67 in its operative position with lever arm 85 turned downward and feeler 62 in contact with die 65. Instead of cam 67 another element can be used to the same effect, e. g., a twin lever or a setting screw.

Figs. 7 and 8 show a control member 70 fitted with a fork-shaped feeler 71 whose upper and lower edges, 72 and 74 respectively, pass along the upper and lower edges, 73 and 75 respectively, of the prototype 76 serving as a double die. The upper spring 77 acts in conjunction with control member 70 if edge 74 is to do the profiling work. Together with plunger 80 the lower spring 78, which can be eliminated by cam 79 operated by lever arm 86, acts upon feeler 71 and control member 70 when the upper edge 72 of feeler 71 is copying. Fig. 8 shows cam 79 disengaged so that the stronger spring 78 overcomes the action of the upper, weaker spring 77. The cam 79 is actuated by the lever arm 86. Of course the profiling device as shown in Figs. 7 and 8 can only be worked on prototypes of limited diameter, but then it has the advantage that the construction of special dies can be dispensed with.

I claim:

1. In a machine tool for the turning of work, having a machine frame carrying a horizontal bed, a horizontal slide slidably arranged to travel on said bed in parallelism with the rotational axis of said work, a plate carried by said slide, a hydraulically operated tool carrying member obliquely slidable on said plate, an upper tool and a lower tool carried by said member, an upper die and a lower die arranged on the bed in vertically spaced relation to each other, a pivotally mounted feeler movable with the tool carrying member for engaging one of the dies when the horizontal slide is slid in one direction during the cutting operation of one of the tools and for engaging the oppositely disposed die when said slide is slid in the opposite direction during the cutting operation of the other of said tools and means operated by said feeler for controlling said cutting operations.

2. In a machine tool for the turning of work, having a machine frame carrying a horizontal bed, a horizontal slide slidably arranged to travel on said bed in parallelism with the rotational axis of said work, a plate carried by said slide, a hydraulically operated tool carrying member obliquely slidable on said plate, an upper tool and a lower tool carried by said member, an upper die and a lower die arranged on the bed in vertically spaced relation to each other, a pivotally mounted feeler movable with the tool carrying member for engaging one of the dies when the horizontal slide is slid in one direction during the cutting operation of one of the tools and for engaging the oppositely disposed die when said slide is slid in the opposite direction during the cutting operation of the other of said tools and means operated by said feeler for controlling said cutting operations, said means comprising a pair of oppositely disposed spring pressed control members in operative engagement with the feeler.

3. A device according to claim 2, wherein the spring pressure on one of the control members is greater than the spring pressure on the other of said members and wherein the said greater pressure may be entirely relieved for the purpose specified.

4. A device according to claim 1 wherein the feeler has a die engaging portion having a quadrilateral lozenge shape in cross section to provide sharp line edge engagement between the said dies and feeler.

5. A device according to claim 2 together with manually operated means for moving the control means and feeler to permit of adjustment of the tools with respect to the work.

6. A device according to claim 1 wherein the dies comprise the opposite surfaces of a prototype of the work to be produced, and wherein the feeler is provided with a pair of oppositely disposed edges for alternately contacting said opposite prototype surfaces.

OTTOMAR von ZELEWSKY.

REFERENCES CITED

The following references are of record in the file of this patent:

UNITED STATES PATENTS

| Number | Name | Date |
|---|---|---|
| 170,538 | Ellis | Nov. 30, 1875 |
| 998,273 | Beuttenmuller | July 18, 1911 |
| 1,166,126 | Gridley | Dec. 28, 1915 |
| 1,373,586 | Barnes | Apr. 5, 1921 |
| 1,474,673 | Husted | Nov. 20, 1923 |
| 1,866,838 | Brustle | July 12, 1932 |
| 1,896,052 | Ferris | Jan. 31, 1933 |
| 2,169,135 | Brandenberger | Aug. 8, 1939 |
| 2,250,241 | Thalmann | July 22, 1941 |
| 2,331,443 | Von Zelewsky et al. | Oct. 12, 1943 |

FOREIGN PATENTS

| Number | Country | Date |
|---|---|---|
| 812,698 | France | May 14, 1937 |